(12) United States Patent
Stansvik

(10) Patent No.: US 6,905,340 B2
(45) Date of Patent: Jun. 14, 2005

(54) EDUCATIONAL DEVICE AND METHOD

(75) Inventor: Björn Stansvik, Ytterby (SE)

(73) Assignee: Mentormate LLC, Minneapolis, MN (US)

(*) Notice: Subject to any disclaimer, the term of this patent is extended or adjusted under 35 U.S.C. 154(b) by 187 days.

(21) Appl. No.: 09/908,468

(22) Filed: Jul. 18, 2001

(65) Prior Publication Data

US 2003/0027122 A1 Feb. 6, 2003

(51) Int. Cl.[7] .................................................. G09B 7/00
(52) U.S. Cl. ...................................... 434/322; 434/323
(58) Field of Search ................................ 434/322–323, 434/350, 236, 362, 156, 157, 167, 169

(56) References Cited

U.S. PATENT DOCUMENTS

| | | | | |
|---|---|---|---|---|
| 4,876,592 A | * | 10/1989 | Von Kohorn | 434/323 X |
| 5,616,033 A | * | 4/1997 | Kerwin | 434/118 X |
| 5,692,906 A | * | 12/1997 | Corder | 434/156 X |
| 5,727,950 A | * | 3/1998 | Cook et al. | 434/350 |
| 5,733,128 A | * | 3/1998 | Getz | 434/157 X |
| 5,820,386 A | * | 10/1998 | Sheppard, II | 434/322 X |
| 5,839,902 A | * | 11/1998 | Wood | 434/130 X |
| 5,904,485 A | * | 5/1999 | Siefert | 434/322 X |
| 6,022,221 A | * | 2/2000 | Boon | 434/156 X |
| 6,086,381 A | * | 7/2000 | Downs et al. | 434/322 X |
| 6,164,975 A | * | 12/2000 | Weingarden et al. | 434/322 X |
| 6,361,322 B1 | * | 3/2002 | Linden Henry | 434/178 X |
| 6,361,326 B1 | * | 3/2002 | Fontana et al. | 434/322 X |
| 6,418,298 B1 | * | 7/2002 | Sonnenfeld | 434/350 X |
| 6,470,170 B1 | * | 10/2002 | Chen et al. | 434/350 |
| 6,511,326 B1 | * | 1/2003 | Galanater et al. | 434/322 X |
| 2001/0036619 A1 | * | 11/2001 | Kerwin | 434/118 |
| 2002/0142278 A1 | * | 10/2002 | Whitehurst et al. | 434/350 |
| 2002/0160347 A1 | * | 10/2002 | Wallace et al. | 434/322 X |

OTHER PUBLICATIONS

Pages from website:<http://www.scienceonthego.com>,– ScienceOnTheGo—Scientific applications for handheld computers, downloaded Apr. 26, 2002, 11 pgs.

Pages from website<http://www.handymed.com>,– HandyMed, LLC—Learn with flash cards or manage lists, downloaded Apr. 26, 2002, 6 pgs.

Pages from website<http://www.supermemo.com>–, Super Memory: Forget about forgetting, downloaded Apr. 26, 2002, 83 pgs.

Skinner, *About Behaviorism*, 1974, Alfred A. Knopf, New York, pp. 1–256.

* cited by examiner

Primary Examiner—Chanda L. Harris
(74) Attorney, Agent, or Firm—Fish & Richardson, PC, PA

(57) ABSTRACT

Methods and apparatus embodying techniques useful in testing students for mastery of educational topics. A plurality of fact elements are accessed and a first fact element is presented in a first semantic format, a first response is received to the fact element in the first semantic format, the first fact element is presented in a second semantic format, and a second response is received to the fact element in the second semantic format. In another aspect, the techniques iteratively present a plurality of fact elements in a plurality of different question formats, and also presents a memory aid. A memory aid may be presented with the fact element.

24 Claims, 10 Drawing Sheets

147

| Class Name | Start Date | Exam Date | Desired Grade | Present Grade | Study Minutes/Day | Days to Exam |
|---|---|---|---|---|---|---|
| Spanish | 9/11 | 9/12 | A | D | 14 | 42 |
| Mathematics | 8/10 | 10/11 | B | D | 4 | 15 |
| U.S. History | 9/9 | 11/11 | A | F | 12 | 11 |
| Biology | 10/26 | 11/11 | B | C | 17 | 11 |
|  |  |  |  |  |  |  |
|  |  |  |  |  |  |  |
|  |  |  |  |  |  |  |

FIG. 9

EDUCATIONAL DEVICE AND METHOD

TECHNICAL FIELD

The invention relates to a system and method for educating a student using questions that are transformed through multiple semantic forms.

BACKGROUND

Society has always attributed a high level of importance to educational achievement. In primitive cultures, education was informal and occurred largely as part of an individual's participation in society. Societal roles evolved over time as people began to specialize in certain trades, such as butchers, tanners, merchants, and carpenters. Training for these roles again occurred through participation—ultimately through organized apprenticeships. In these contexts, learning took place though observing and imitating, and in a public context.

As societies grow more complex and develop much greater knowledge, they also develop a greater need for formal education and a greater ability to spend time acquiring education, rather than on meeting day-to-day needs. Such education typically involves memorizing or analyzing facts and situations that are only indirectly relevant to everyday life, and that may not involve personal experience of an event. For example, in learning history, one may at best approximate a personal experience of an event. Alternatively, in learning mathematics, one generally learns basic operations in the abstract and later progresses to hypothetical examples that employ the concepts.

The natural learning process is one of continual progression, with each level of knowledge building on what was previously learned. One way in which to encourage continual progression in learning is to provide a student with a stretched goal that moves outward as the student comes closer to the goal.

One manner by which abstract ideas or a large group of facts may be learned is through drills, such as repeated questioning on various aspects of a topic of interest. Examples include flash cards. Drilling may be automated using computing devices, such as personal computers or personal digital assistants (PDAs). For example, interactive drilling may be provided with multiple choice, true/false, and short-answer questions. Examples of computer-based drilling systems are Flash!™ and Supermemo™. There is a need for a computer drilling system that stretches a student's abilities to help maximize the amount of information that the student can learn in a given time frame.

SUMMARY OF THE INVENTION

In general, the invention is a system and method for teaching a student by presenting questions regarding various fact elements in varying semantic forms. The invention determines the questions to ask a student, or the format in which to ask a question, based on the student's answers to previous questions. By changing the semantic format in which a fact element is presented, the invention induces different cognitive processes in a student's brain so as to increase the student's retention of the material that is studied. In addition, the invention may be implemented on an electronic device so that the learning process can be made private but at the same time effective. The private presentation of the information helps to minimize any stigma a student may feel about the learning process and its inherent difficulties.

In one configuration, a method accesses a plurality of fact elements, wherein each fact element represents a unit of information about an educational topic. The method presents a first fact element to the student in a first semantic format, receives from the student a first response to the first fact element in the first semantic format, presents the first fact element in a second semantic format, and receives from the student a second response to first fact element in the second semantic format. The fact element may be presented in the second semantic format only if the response to the fact element in the first semantic format matches a predetermined correct answer, and may be arranged in a queue, wherein a particular fact element is placed at the back end of the queue if the response to the fact element matches a predetermined correct answer. The semantic formats may be fact, true/false, double choice, multiple choice, open-ended, fill-in-the-blank, or reverse open-ended. A memory aid, such as a picture made up of a plurality of distinct drawing components, may be presented when the fact element is presented.

According to another aspect, a computer-readable medium carrying program code is disclosed. The code, when executed, accesses a plurality of fact elements, each of which represents a unit of information about an educational topic. The code presents a first fact element in a first semantic format and receives a response from a user. The code also presents the element in a second semantic format and receives a response from the user. The code may also compare the first response to a predetermined correct response and cause the first fact element to be presented in the second semantic form only if the first response matches the predetermined correct response.

In another configuration, a method is implemented in a computer program application operable to conduct a question-and-answer testing session. The method comprises the steps of accessing a plurality of fact elements. The method iteratively presents the plurality of fact elements in a plurality of different question formats. A plurality of answers may also be received from a user, wherein each answer corresponds to a presentation of a fact element in a particular form, and each of the plurality of answers is compared to a predetermined correct answer.

Various embodiments of the invention are set forth in the accompanying drawings and the description below. Other features and advantages of the invention will become apparent from the description, the drawings, and the claims.

BRIEF DESCRIPTION OF THE DRAWINGS

FIG. 9 illustrates a display for tracking a student's progress in multiple subjects.

DETAILED DESCRIPTION

Figure 1:
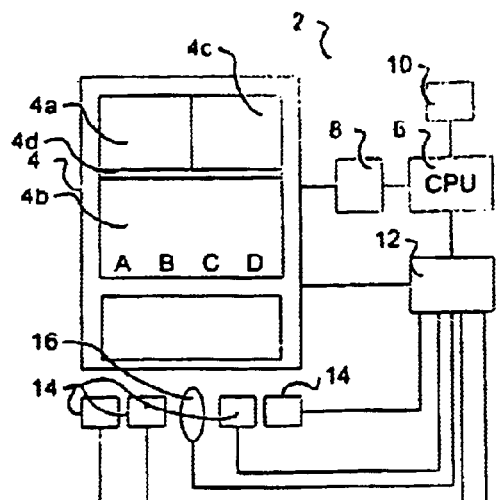
FIG. 1 is a block diagram of a device that presents testing information to a student in accordance with the invention.

FIG. 1 is a block diagram of a device 2 that presents testing information to a student. Device 2 may take the form of a personal digital assistant (PDA), which may have a display 4 for presenting educational information to the student, for example, in the form of question-and-answer quizzing. Display 4 may be coupled to a central processor unit 6 through graphics processor 8, so that display 4 may present the information as directed by central processor unit 6. Memory 10 may store the information and may be accessed as needed by central processor unit 6. Central processor unit 6 may respond to input signals received, for example, through input module 12. A student may enter commands through input buttons 14 or by writing on a touch-sensitive overlay on display 4. In addition, a selection button 16 capable of producing two different inputs depending on where the button 16 is pressed, may be provided for additional functionality, such as navigating through a number of questions. Alternatively, a student may receive information by other means, such as moving video or sound, and may provide input by other means, such as by speaking.

Display 4 may present information in a number of areas. For example, display 4 may have a question area 4a in which questions may be posed and an answer area 4b where answers may be entered or possible answers may be presented. In addition, display 4 may provide assistance or visual cues in feedback area 4c, and may also show a student's progress toward completing review of a particular topic in status bar 4d. Moreover, display 4 may also accept input if it is a touch-sensitive display, and may in this manner display particular choices relating to a fact element. Those choices may relate to input buttons 14, as shown by the letters on display 4 above input buttons 14, and discussed more fully below. As a simple example, question area 4a may display "2+2," and answer area may display a single number if the question is being asked in a true/false format, or may display multiple (e.g., four) different number choices if it is being asked in a multiple-choice format.

Using these components, device 2 may store information about certain educational topics in memory 10. Device 2 may use this information to present a student with questions about the educational topics, and may seek answers from the student. Device 2 may verify the accuracy of the answers, and may allow the student or others to track the student's performance. Device 2 may also link to other devices to receive additional educational information and to report data or information that reflects the student's performance.

Figure 2:
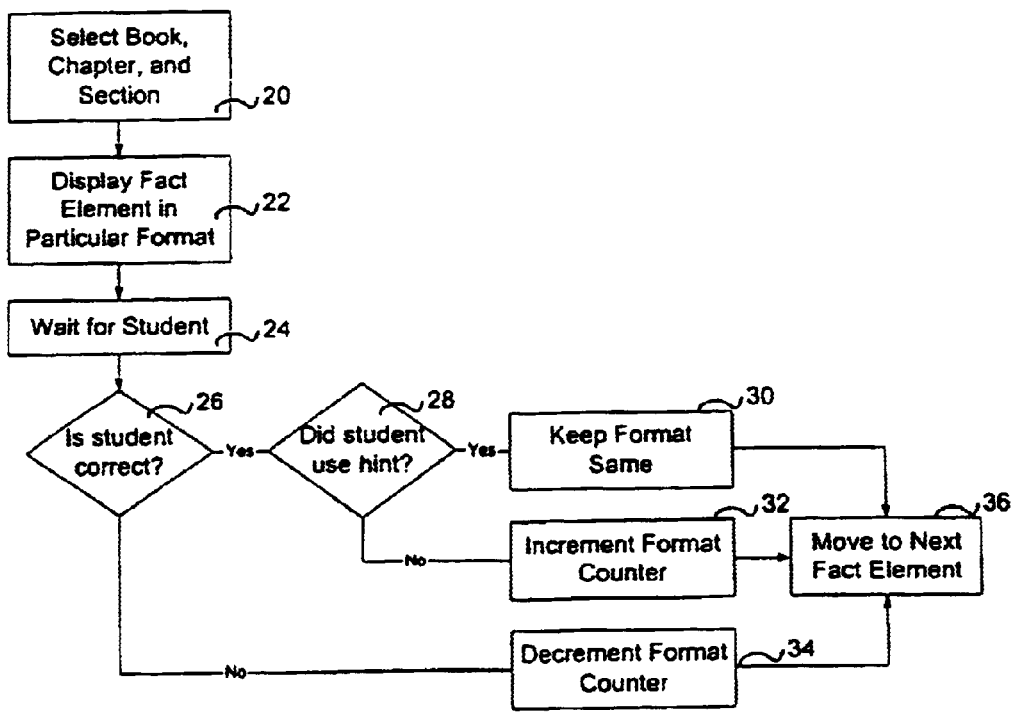
FIG. 2 is a flowchart showing the selection and presentation of a particular fact element to a student.

FIG. 2 is a flowchart showing the process by which fact elements may be selected and displayed to a student on device 2. Initially, as shown by box 20, the student may select a book, chapter, and subsection on which testing will be conducted. In particular, fact elements that are presented to a student may be drafted so as to correlate to a textbook that the student is reading. Device 2 may display a fact element from the selected subsection in a particular format 22. For example, initially the fact element may be displayed in a fact format, as a question followed by a correct answer, so as to show the student the proper response to the question. The fact element could also be posed as a true/false question, as a double-choice question or series of double-choice questions (in which two possible answers are presented each time), as a multiple choice question, as an open-ended question, as a fill-in-the-blank question, or as a reverse open-ended question (i.e., an open-ended question in which the answer is given and the student is asked to provide the question or a portion of the question). The former formats are more "basic" and are therefore generally easier to answer, while the latter are generally more difficult to answer.

Device 2 may also provide a student with the option of receiving a hint in appropriate circumstances. Later presentations of the fact element may occur in different formats, as described in more detail below. In addition, the display of a particular fact element may generally be interspersed with the display of other fact elements, whose display formats may be independent of each other or related to each other. This display of fact elements may be ordered, such as by placing the fact elements in queue for display, or it may be randomized.

Device 2 may also seek a response from a student, such as when a question is asked and an answer to the question is sought, as shown by box 24. When a response is received, it is checked for correctness 26; if the response is incorrect, a variable controlling the format of the fact element may be decremented 34 or left unchanged so that the fact element is displayed in the same format or a more basic format the next time it is presented to the student. If the response is correct, device 2 may check to determine whether the student needed a hint 28 to answer the question. If a hint was needed, the variable controlling the format of the fact element may be left unchanged 30, while if no hint was needed, the variable may be incremented 32, so that the fact element is displayed in a different, perhaps more difficult, format the next time it is presented. When the device 2 has finished with one round of the fact element, it may move to the next fact element 36 and repeat the process. In this manner, a number of fact elements may be quizzed in increasingly difficult formats as a student learns each fact element.

Figure 3:
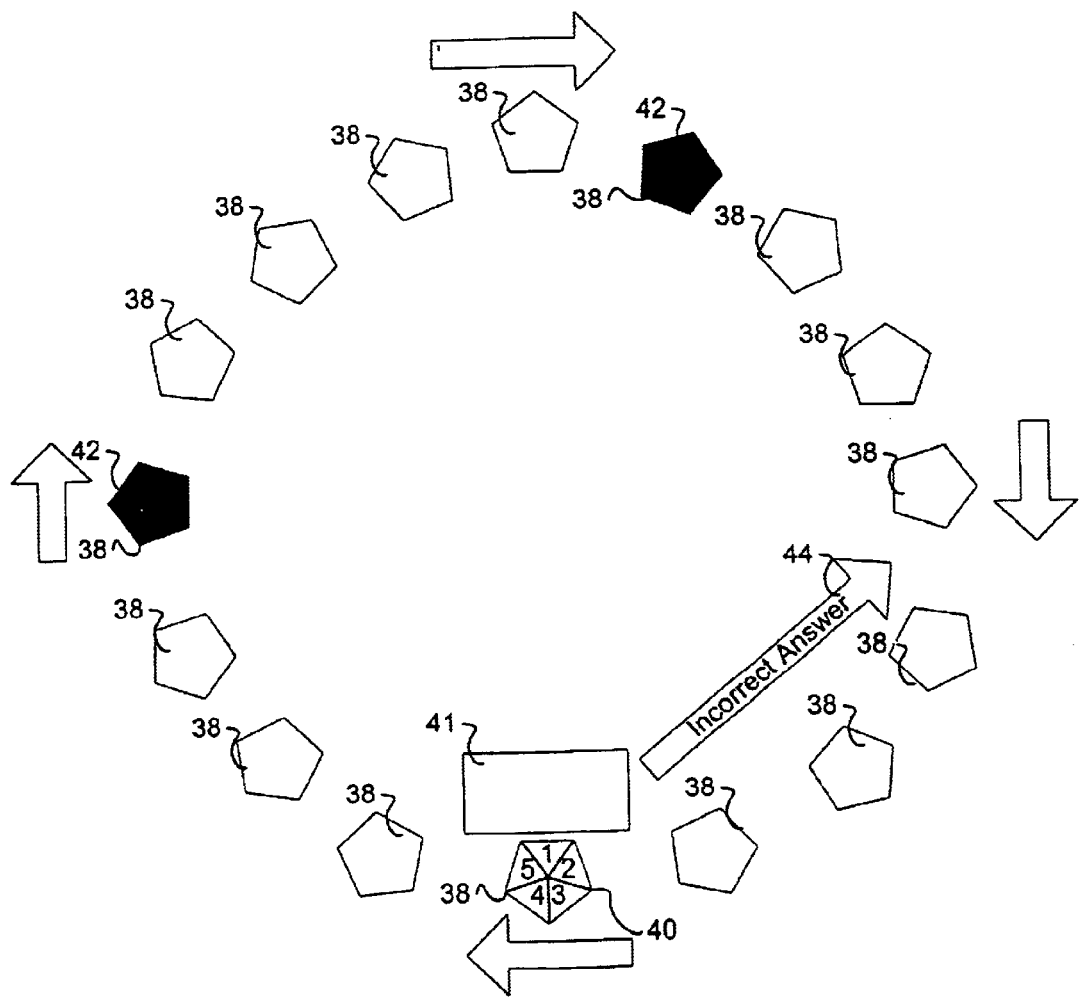
FIG. 3 is a conceptual diagram illustrating an aspect of the invention.

FIG. 3 is a conceptual diagram of a system and process for presenting a plurality of fact elements 38 to a student in various forms. FIG. 3 illustrates the general process of FIG. 2, but expands the process to show the interaction with multiple fact elements 38. Each fact element may represent a particular piece of information on which a student may be tested, and may be represented by a fact statement or question, and a plurality of possible answers, where one answer is correct and the others are incorrect. The components of a fact element 38 may allow the fact element 38 to be posed to a student in a plurality of different formats, including a plurality of different semantic formats, as discussed above.

In a preferred embodiment, each fact element may be presented to a student multiple times, each time in a format that is more difficult to answer than the previous time the fact element was presented. Many related fact elements 38 may be presented through an automated, interactive quizzing process, so that a student may be presented with many different questions on a particular topic or topics, with the fact elements and the formats intermingled. The questions may be presented to a student through a personal digital assistant (PDA) which may obtain groups of fact elements or other information from a central repository of information.

In general, the illustrated process comprises presenting a student with questions related to each of the fact elements in a controlled manner. In FIG. 3, fact elements 38 are represented as pentagons, wherein each side on a pentagon represents a format in which the fact element may be posed to a student. The fact elements 38 may be arranged in a queue that permits them to be posed to a student multiple times. The fact elements 38 are illustrated as resting in a circle to represent the queue, and the arrows around the queue show the queue rotating to represent the advancement of the fact elements 38 in the queue. In the representation, the queue of fact elements 38 rotates clockwise as each question is posed to a student, so that the student is exposed to each fact element in turn. As the queue rotates, one fact element at a time, active element 40, is addressed by inquiry module 41, which extracts the appropriate information so that the fact element may be presented to a student, such as through a question-and-answer quizzing session.

Each of the fact elements 38 may have associated with it a tracking number that determines the format in which the element is presented. In one embodiment, the tracking number may be initially set to present the data element in a format that is the easiest to answer. The element's tracking number may be advanced each time the element is presented so that it is presented each time in a format that is more difficult to answer. If the student does not answer one format correctly, the fact element may be placed back in the queue (as described below), and the tracking number may not be advanced, so that the question is asked in the same format the next time it is presented. Additionally, the fact element may be placed toward the top of the queue so that it is addressed more quickly than it otherwise would be addressed. If an incorrect answer is given, the tracking number may also be decremented.

For example, active element 40 may be moved, as shown by arrow 44, to a location near the front of the queue if it answered incorrectly. In this way, the same question may be posed to a student relatively quickly to ensure that the student has at least a limited understanding of the particular fact element. The question posed to the student may alternatively be changed slightly within the particular format when the active element 40 is next presented. For example, if the format of the question is multiple-choice, the choices presented to the student may be arranged in a different order each time, or different incorrect answers may be provided each time. The question could also be asked in the same format each time, but with slightly different wording so that the student does not simply memorize the question. Once a particular active element 40 has been processed and replaced in the queue, the queue may be advanced (clockwise in FIG. 3) so that the next fact element is interrogated.

In contrast, if the student answers correctly, the tracking number may be advanced to the next format, so that the fact element is presented in a different, and possibly more difficult, way the next time the student encounters it. The fact element may also be placed at the end of the queue (i.e., left in its same position) and the queue may be advanced (i.e., rotated clockwise) one position. In this manner, a particular fact element will not be repeated to the student for a long time, because the student's correct answer indicates that the student has at least a limited understanding of the fact element. In addition, the fact element will be presented in a different, and perhaps more difficult, format when it is next encountered, because the tracking number has been incremented.

Active element 40 is addressed by inquiry module 41, which may, depending on the current tracking number of active element 40, retrieve a question format and one or more answers for active element 40. For example, inquiry module 41 may retrieve a question that matches a true/false format, and may also retrieve a proposed answer. Inquiry module 41 may determine whether the proposed answer should be "true" or "false," and may display the question and the answer to the student. Inquiry module 41 may then wait for a response from the student and may check the response to determine whether it is correct or incorrect. Alternatively, inquiry module 41 may present a fact element in a fact format, as described above; this format may also be considered to be a question, even though it does not call for an answer from a student.

Quizzing of a particular element or all the elements may be halted in a number of ways. For example, when the tracking number for a particular fact element reaches a predetermined value, thereby representing that each question format for the fact element has been correctly answered, the fact element may be made inactive or removed from the queue so that no more questions about it are asked. Inactive elements 46 are indicated as shaded pentagons in FIG. 3.

Alternatively, a student may make a fact element inactive or remove it from the queue manually. For example, if the student has answered a question about the element correctly and believes that he or she fully understands the element, the system may allow him or her to select whether the fact element should be made inactive (i.e., the student may be allowed to "kill" the element). As an alternative to removing fact elements 38 from the queue, the elements may remain in the queue and may be marked so that the system passes over them, as indicated by inactive elements 42. Quizzing of a student may take place until every format of every fact element has been answered correctly, or until some predetermined number of questions has been properly answered, for example, at least three formats for each data element have been correctly answered, or by some other method.

Although the process is described above as involving removing elements from a rotating queue, that analogy is provided only for means of simple illustration. For example, fact elements 38 may stay stationary within a single location in computer storage, and the "queue" function may be carried out by incrementing a pointer to the queue after each fact element is handled. The processing of fact elements 38 may also be carried out by any of a number of other well-known processing techniques. Multiple subjects that are stored separately may be quizzed at the same time, and the application may be programmed to select fact elements 38 from each subject in a manner that mixes the questions provided to a student. In addition, fact elements 38 may be linked to each other, so that a correct or incorrect answer to one element changes the manner in which the other elements are posed to a student or the order in which they are posed.

Figure 4:
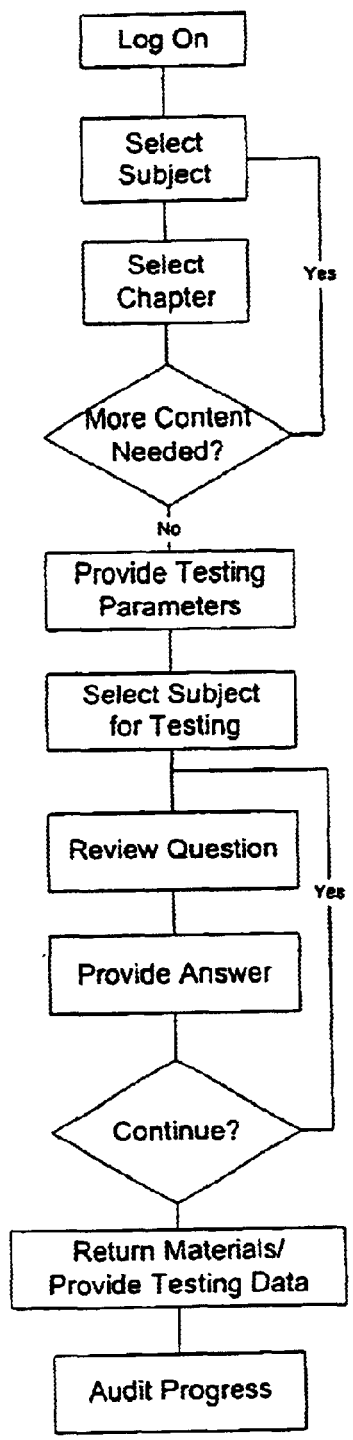
FIG. 4 is a flow chart that illustrates the operation of a software program in accordance with the invention.

FIG. 4 is a flow chart that illustrates a process for obtaining educational content and conducting testing using the content. The flowchart is similar to the flowchart in FIG. 2, but shows the testing process from a student's perspective. A student may initially log onto a system that stores education information, or content. For example, the student could access an Internet site and provide an identification number and corresponding password. The student may then be presented with a number of subjects for study, such as all available subjects to which the student has subscribed, and which correspond to subjects the student is studying. The student may automatically be provided with information corresponding to the text that the student is using (for example, if the student or another person has earlier identified the relevant text), and the student may select to download groups of fact elements that correspond to a particular chapter or chapters of the text. The student may then continue gathering information until all information has been downloaded. At any point in the process of gathering or reviewing information, the student may also provide parameters for the testing, such as the date on which review of a subject must be completed, desired proficiency in a subject, preferred modes of testing, and other such parameters.

After downloading fact elements on a subject or subjects, a student may, at his or her discretion, select material for study and testing. When a subject and a particular group of fact elements (such as those related to a chapter in a textbook) are selected, the student may be provided with a progression of questions for the fact elements, and each fact element may be presented in a variety of semantic formats. The student may continue the testing until all the fact elements in a group have been answered correctly in each semantic format, or until some other event occurs. The student may also take a break, and testing may resume from the point at which the student left it.

The student may be shown possible answers to a question, and the answers may be aligned with particular input devices, such as fixed input buttons on a PDA. For example, if the PDA has four buttons along its bottom edge, a multiple choice question having four possible answers may be presented to the student, where each proposed answer aligns with a button. Graphical elements corresponding to a data element may also be presented to the student to assist in the student's recognition of the data element. For example, a triangle may be shown as part of an explanation of the Pythagorean theorem, and a full explanation of the fact element may be provided, either automatically or at the student's option, particularly when the student answers a question incorrectly. A graphical element may also be presented as part of a question, for example, where a biology student is prompted to identify an anatomical part of an organism or an economics student is prompted to identify a part of a chart or graph. In addition, noises or sounds may also be employed to aid in the quizzing process and to increase the student's retention of information. For example, a graphic or sound that is unrelated to the fact element may be displayed or played whenever the fact element is presented, so that the student forms an subconscious link between the graphic or noise and the fact element.

Advantageously, the described process may enable a student to learn a subject more quickly than he or she would through quizzing that does not adjust the question format based upon a student's progress in answering previous questions. Because the fact elements and question formats may be provided to the student from a central repository, the student can immediately begin learning, and the questions may be developed specifically to match the text from which a student is learning. The student may also supplement the general fact elements with his or her own fact elements, and could trade fact elements with other students.

The quizzing process may be established to maximize the student's absorption and retention of information. For example, as noted above, the process may begin with relatively simple questions and question formats, and may proceed through more difficult question formats until a student has achieved mastery of a subject. As a result, a student is less likely to quit studying because the quizzing is initially too difficult. In addition, learning may be accomplished from a number of directions, so that the student may have multiple opportunities for learning a subject. Also, by providing questions in a variety of formats, the system may reduce student fatigue and may thus make the learning process more enjoyable, particularly for younger students. Furthermore, the student's knowledge may be gradually increased as the student is presented with a goal that moves outward.

The educational information may be arranged hierarchically as modules, clusters, fact elements, and data fields. A module generally corresponds to a particular subject during a study period, such as a single school term. A cluster corresponds to a logical unit of related educational information, such as the chapters in a textbook. A cluster may be a more closely related group of educational information, and may comprise one or more fact elements, which correspond to a particular piece of information (a factoid or datum) and a question and answer set for the piece of information.

Each fact element may have associated with it a plurality of fields that characterize the fact element. Table 1 below shows examples of fields that may be associated with a fact element and possible values for the fields. In general, a fact element may be represented to a student as a question, a correct answer, and a plurality of incorrect answers. The correct and incorrect answers are shown by appropriately-named fields in Table 1. In addition, certain fields may contain keywords for questions or answers so that a response may be considered correct even if the entire, verbatim answer is not provided by a student. Other information in Table 1 may be used to support the display of the fact element to a student in various formats.

TABLE 1

| Field | Representative Value |
| --- | --- |
| SubsectionID | 03121 |
| FactElementID | 034 |
| FactElementType | 2 |
| KeyboardType | 1 |
| Status | 3 |
| PageNumber | 612 |
| Question | Who was the first European to discover America? |
| QuestionKeyword1 | European |
| QuestionKeyword2 | Discover |
| QuestionKeyword3 | America |
| CorrectAnswer1 | Leif Erickson, a Viking Explorer, around 1,000 A.D. |
| CorrectAnswer2 | Leif |
| CorrectAnswer3 | Erickson |
| AnswerKeyword1 | Leif |
| AnswerKeyword2 | Erickson |
| AnswerKeyword3 | 0 |
| AnswerKeyword4 | 0 |
| AnswerKeyword5 | 0 |
| IncorrectAnswer1 | Christopher Columbus, an Italian explorer, in 1492 A.D. |
| IncorrectAnswer2 | Vasco de Gama, a Portuguese explorer, in 1562 A.D. |
| IncorrectAnswer3 | George Washington, in 1776 A.D. |
| IncorrectAnswer4 | Marc Anthony, a British king, in 1702 A.D. |

The SubsectionID may simply identify the group or groups of fact elements with which the particular fact element is related, while the FactElementID may identify the fact element within the group.

Likewise, the fact element may be characterized by its "type." The fact element type represents the format taken by questions and answers related to the fact element. The type helps control the manner in which the fact element is displayed and the answers that are permitted when answering a question relating to the fact element. For example, the answer may be an exact value, while the question may be a sentence. Such a fact element could be a question regarding the year in which an event occurred. Alternatively, the answer and the question could both be exact values, such as with a vocabulary test for a foreign language. As another example, the answer could be a sentence, and the question could be a sentence, such as with the example shown in Table 1. Also, the question could be a sentence and the answer could be a word, but not one for which an exact answer is required. The answer could also be taken in multiple steps. Such a form is generally used in the field of mathematics, wherein a student may be asked to solve a problem step-by-step. The fact element type in such a situation may be represented by an integer tracking number.

Other fields assist in the tracking and display of the fact element. The value of the KeyboardType field indicates to the device what sort of input device should be used with a particular fact element. For example, when a fact element is presented in some formats, it may be necessary to display a numeric keyboard (e.g., if the answer that is sought is a date or a mathematical answer), a foreign language keyboard (e.g., if the application is a foreign language review), or even an input means such as a microphone with voice recognition capability. The PageNumber field may provide a reference to a textbook with which the fact elements are associated, so that, for example, the student can be referred to the textbook if review is needed.

The Status field tracks the format in which a fact element is to be displayed; it may take the form of an integer that represents, for example, the following formats: fact, true/false, double choice, multiple choice, fill in the blanks for a question, or fill in the blanks for an answer. The fact format may simply display a question and the correct answer. The true/false format may present the fact element in the form of a true/false question, such as by posing the question and presenting a proposed answer chosen from the CorrectAnswer or IncorrectAnswer fields. The double choice format may pose the same question as the true/false format, and may present two answers (one correct and one incorrect), while the multiple choice format may display the question with more than one possible answer. A double choice format may thus be considered a special case of the multiple choice format. The open-ended question format may simply pose the question and seek a response, while the reverse open-ended question format may present the correct answer and may seek the corresponding question, or an approximation of the question. For example, if the correct answer is "Leif Eriksson," the response sought could be any entry that includes "discover America," "European discover America," "1000," or some other similar combination of elements, such as predesignated keywords or key-letters.

Figure 5A:
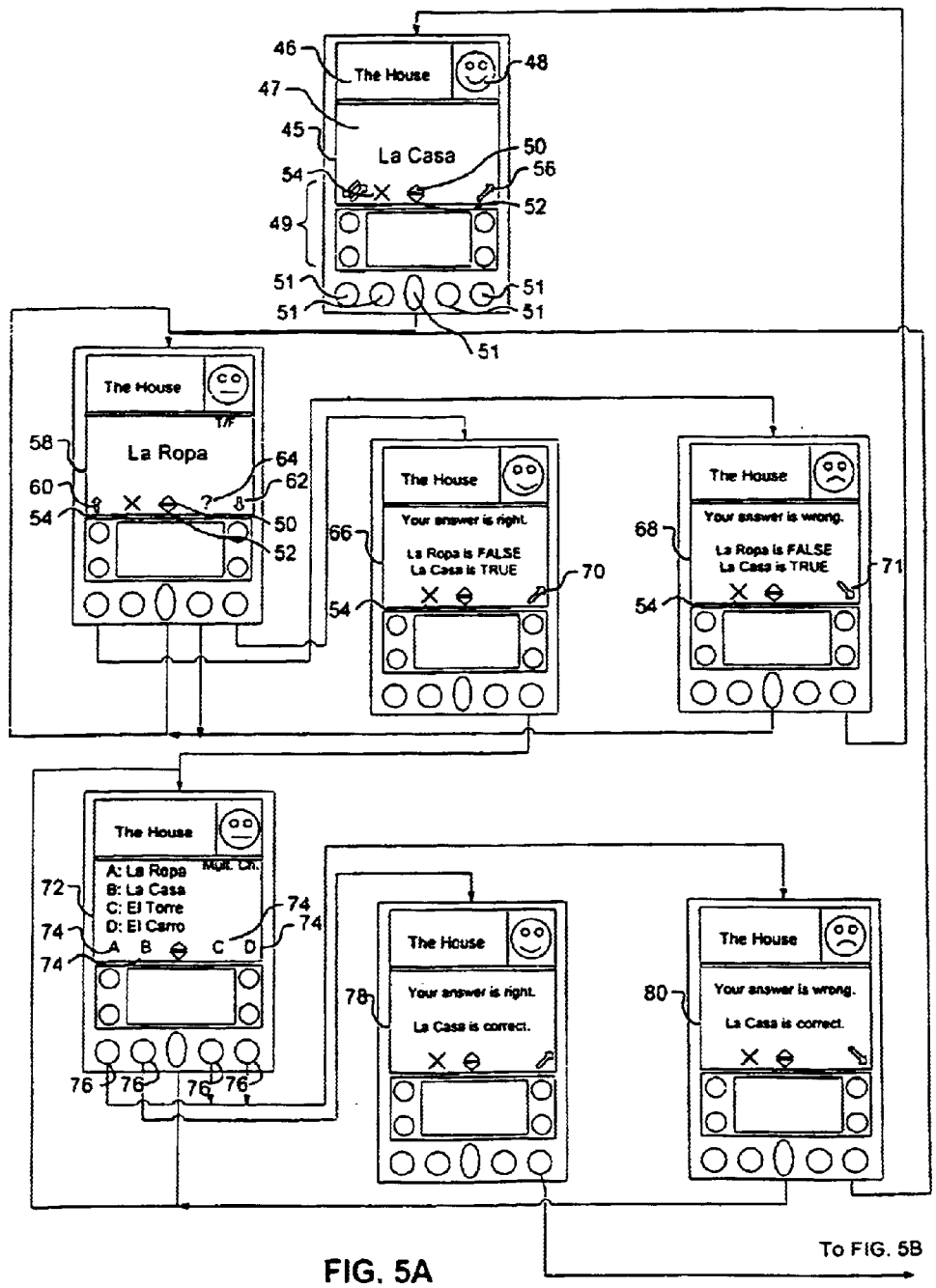
FIGS. 5A and 5B illustrate, in a flow chart, a data element displayed to a student.
Figure 5B:
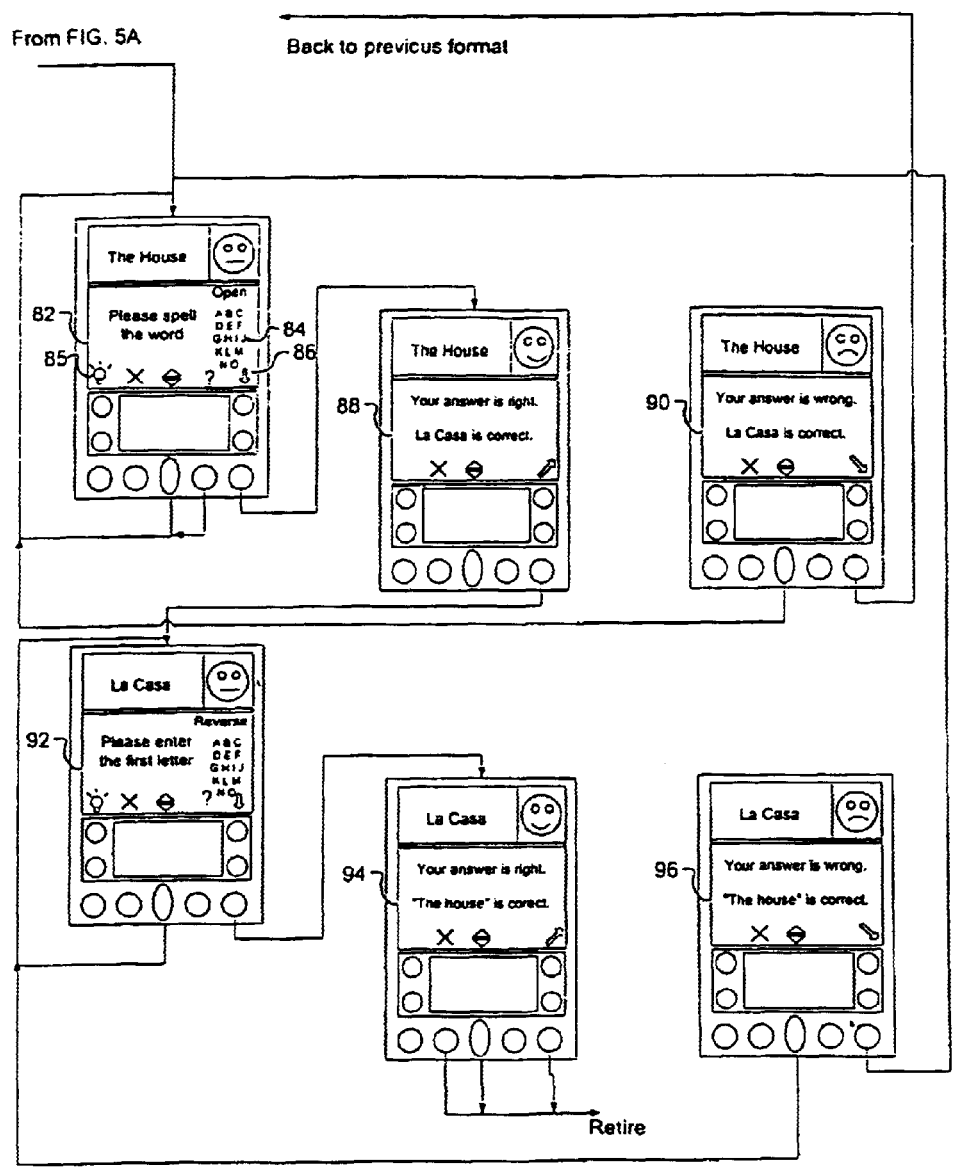

FIGS. 5A and 5B illustrate, through a flow diagram, educational information that may be displayed to a student. In particular, various displays are shown of questions that may be posed to a student, along with the displays that result, based upon various answers by the student. The questions may represent various fact elements and may be displayed in a number of different formats. Display 45 includes a question area 46, an answer area 47, and feedback area 48. Any of these areas and other areas of display 45, such as control area 49, may also be used to input information. In addition, buttons 51 may be used for input and control, either alone or in combination with display 45. In display 45, a Spanish-language quiz is shown, with the question posed, along with the appropriate answer. The question consists of an English term, while the answer consists of a Spanish term.

A student is provided with several options in control area 49. Arrows 50, 52 allow the student to move between questions or fact elements; up arrow 50 allows the student to review the previous question, while down arrow 52 allows the student to skip forward to the next question. If the student skips forward, the question does not get advanced to another format. By selecting kill button 54, the student may eliminate, or retire, a fact element from consideration, so that it is not presented again during a testing session. Alternatively, the kill option may only be provided after the student answers a question correctly, so that the student cannot kill a fact element that the student has not learned. If the student would like to advance to the next fact element and have the current fact element displayed in a different format in the future, the student may select promote button 56, although it is possible to only present promote button 56 if the student has answered a question correctly.

Display 58 illustrates the fact element in a true/false format. True selection 60 and false selection 62 allow the student to answer the question. The student may also select button 64 if the student is unsure of an answer. Again, kill button 54 may be provided along with up arrow 50 and down arrow 52. Although the fact element is shown in the figure as appearing in true-false format immediately after it appears as a fact, it should be appreciated that in operation, many other fact elements may be displayed in one or more formats between each display of any other fact element.

Displays 66, 68 indicate the results of various selections made by a student in response to the true/false question. If the student selects the correct answer, display 66 indicates that the answer is correct and may also display additional information about the fact element. For example, where the answer to a true/false question is false, the proper answer may be shown to help reinforce the student's knowledge of the answer. The student may also be given the option to kill the fact element, as noted above. In addition, a promote button 70 may be provided, whereby the student may choose to promote the fact element so that it is displayed in a more difficult format in the future. Alternatively, the function of promoting a fact element may occur automatically when a question is answered correctly. If the student answers the question incorrectly, display 68 may announce that the answer is incorrect, and show the proper response. In addition, the student may be given the option to kill or to demote the fact element (although the kill option may be disabled where the answer was wrong), or to move on to the next fact element without affecting the manner in which the current fact element is displayed in the future.

Display 72 illustrates the fact element the next time that it is displayed, this time in multiple-choice format. The question may again be displayed, but this time with several different proposed answers. The student may select one of the proposed answers by touching it, by touching its associated letter 74 at the bottom of display 72, or by pressing a button 76 that is aligned with the letter 74. Again, the student is shown one display 78 if the answer is correct, and another display 80 if the answer is incorrect. The fact element may be promoted to a higher level, either by the student or automatically, if the answer is correct and demoted if the answer is incorrect. Although not pictured, the fact element may be presented in double choice format much in the same way it is presented in multiple choice format.

Display 82 illustrates the fact element presented in an open-ended format. In this format, the English-language form of the term is displayed as a question, and the student is directed to enter the Spanish-language form of the term. The student could enter the answer using a keyboard, by speaking it, by writing the answer on the display (including by using a shorthand writing method), or by selecting characters from character set 84. The user may also be provided with an end-of-entry indicator 86 that the student may select when the entire answer has been provided. Also, the user may seek a hint by selecting icon 85. As with the other presentations of the fact element, correct or incorrect answers may lead to display, 88 or display 90, respectively, that permit the student to affect, whether, and in what manner, the fact element may be displayed in the future.

Likewise, display 92 illustrates the fact element presented in reverse open-ended format (i.e., with the Spanish-language term as a question) and provides different displays 94, 96, depending on whether the student answers correctly or incorrectly. If the fact element is promoted from display 94, it may be retired from the quizzing session.

Fact elements may be presented in each format in a variety of configurations, depending on the type of fact element. For example, the foreign language drill that was just described involved a fact element that required an exact answer and had a question that comprised a word or words. As a result, the questions under each format were presented by displaying the words rather than by displaying a formal question. Alternatively, the question could be posed in the form of a formal question. As an example, the question could seek the date of a historic event. The question, "When did the [event] occur?" could be shown under the true/false, multiple choice, and open-ended formats, and the proper date may be sought as an answer. For the reverse open-ended format, the date could be provided, and the student may be asked to fill in the name of the event, or provide keywords or keyletters. When the date is sought for the open-ended question, the display may show a numeric character set, whereas when the name of the event is sought, the display may show an alpha-numeric character set.

In addition, the question could be a phrase that requires a single word or multiple words for an answer, depending on the format in which the fact element is presented. For example, the question could be "What is the capital of Sweden," with an answer of "Stockholm." For each of the true/false, double choice, multiple choice, and open-ended formats, the question may be posed, and the answer may be received, much like the example described above. For the reverse open-ended format, however, the answer could be posed as "Stockholm," and the question could be posed as "What is the _____ of _____?" For answers, the system could seek the actual words, or designated keywords or keyletters.

Alternatively, the question could be a phrase that requires a phrase as an answer. In the true/false format, both the question phrase and a purported answer phrase may be displayed. In the multiple-choice format, the question phrase and several purported answer phrases may be displayed. In both the open-ended and reverse open-ended formats, one of the phrases may be presented, and the student may be asked to provide the other phrase or key words within the phrase. Under any option, the system may be provided with a thesaurus, dictionary, or other feature that will accept answers as correct even if they are not exact matches for the desired words or phrases.

Figure 6:
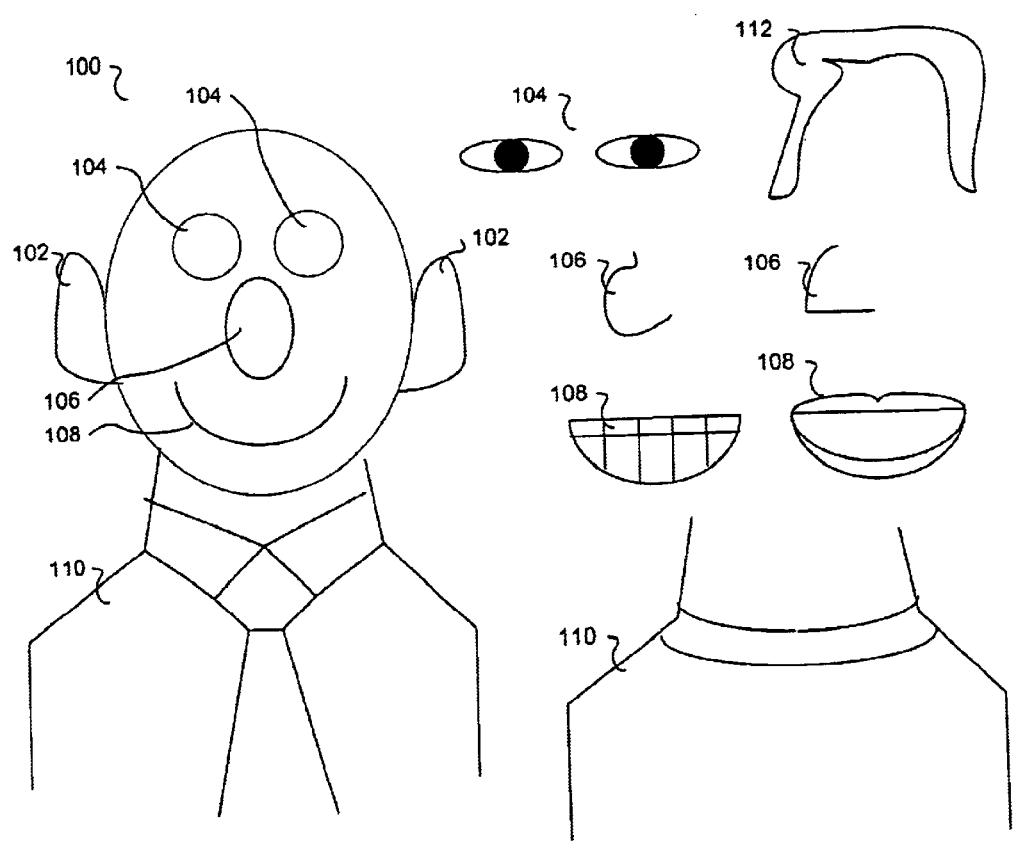
FIG. 6 shows a display of a multi-element memory aid.

A memory aid or aids may also be associated with a particular fact element or group of fact elements. For example, FIG. 6 illustrates a very simple picture 100 that may be associated with a fact element. Each time the fact element is displayed, regardless of its format, the associated picture 100 may also be displayed. In this manner, the picture may serve as a memory aid or "memory crutch" by providing a student with a repeated and familiar representation that relates to the fact element. Picture 100 may relate to the fact element by loosely suggesting the proper answer to a question posed about the fact element. For example, the object represented by the picture could physically look like the proper answer or could begin with the same letter as the proper answer. Alternatively, picture 100 could have no relation to the fact element other than its association with the fact element as a memory aid. For example, picture 100 could represent an object that has no apparent connection to the fact element.

Picture 100 may be composed of a combination of drawing components that may be mixed and matched to create a number of different pictures. For example, picture 100 may be a portrait, for which the face is produced from eye components 104, a nose component 106, and a mouth component 108. In addition, the portrait may be provided with ear components 102 and a body component 110 or components. As shown beside picture 100, additional drawing components may be provided and be swapped with those shown in the portrait so as to create a plurality of different pictures out of a relatively small number of building blocks. For example, in addition to the components that can be substituted for those in the portrait, additional components such as hair 112 can be added. Advantageously, the building up of memory aids from individual shared components can help save on storage space and on the effort required to create the aids, and can also permit the assignment of similar memory aids to similar fact elements.

A particular picture may be assigned to a fact element in any of a number of ways. For example, one arrangement of picture components may correspond to a predetermined number or a random number. Each fact element may then be assigned a number, in either a predetermined, calculated, or random manner. As an example, each fact element could be assigned a number in which each digit corresponds to one drawing component, and the value of the digit represents which form of the component is displayed. The number may also be assigned through a calculation or in a predetermined manner, such as when it is desired to have the picture correspond to the correct answer associated with the fact element.

The memory aid can also take alternative forms. For example, the memory aid could be a sound or combination of sounds that are played each time a fact element is presented to a student. In addition, the memory aid could be a combination of a picture and a sound. The memory aid could also be withheld initially from the student, such as by only providing the aid after the student has requested a hint. When the memory aid takes a visible form, it can be displayed in feedback area 48 shown in FIG. 5A.

Figure 7:
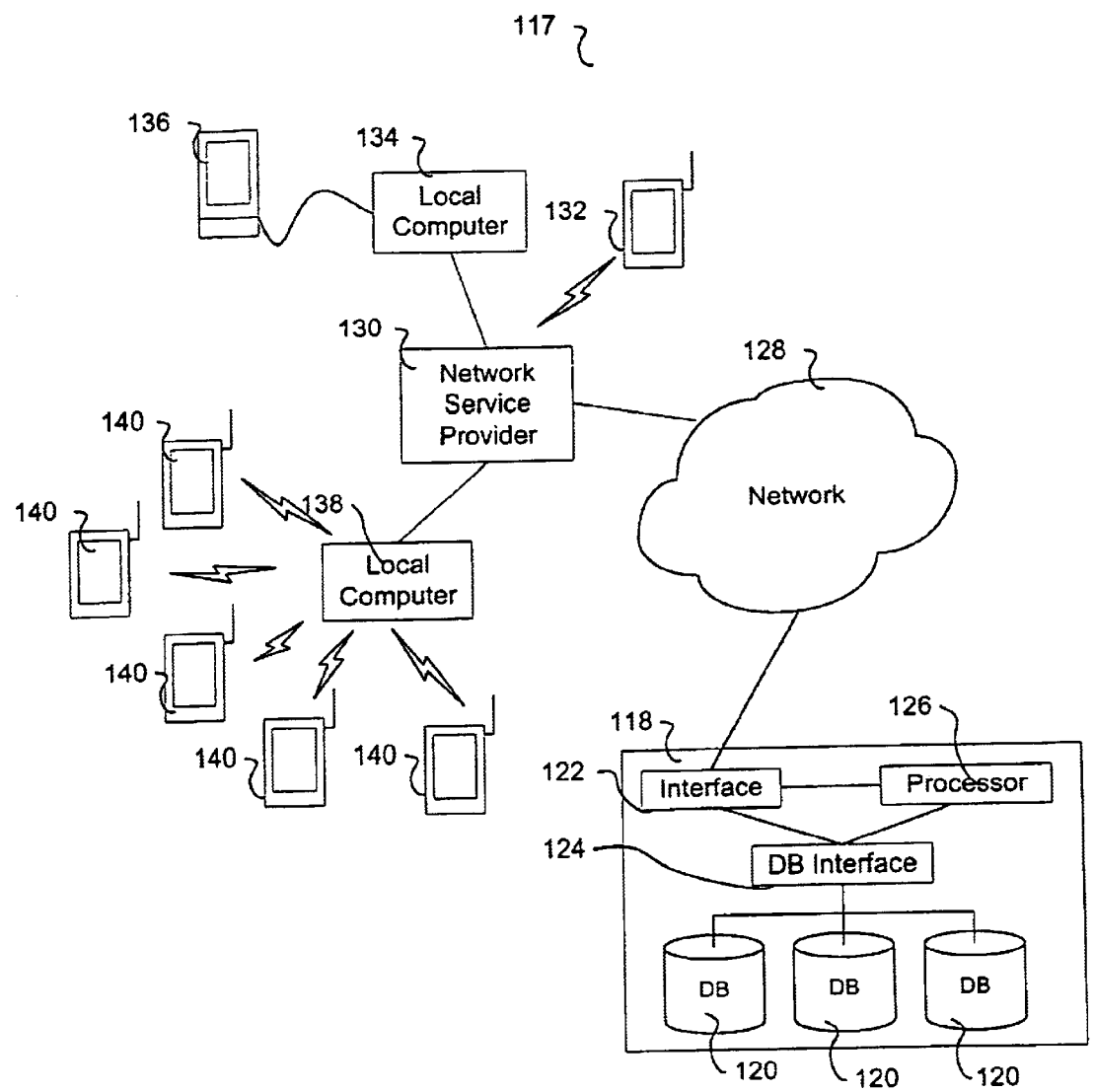
FIG. 7 is a block diagram of an educational system in accordance with the invention.

FIG. 7 is a block diagram of an educational system 117 in accordance with the invention, and may include device 2 as shown in FIG. 1 as, for example, a PDA. Data repository 118 may store, in databases 120, information regarding educational topics to be tested. Databases 120 may include questions, answers, or other information, on particular topics and may be arranged in repository 118 based on topics or another basis. Although databases 120 are shown as separate databases, the information could be stored in a single database, in multiple databases on a single system, or on multiple distributed databases 120. Repository 118 may also contain a database interface 104 for providing information from databases 120 to processor 126. In addition to storing educational content, repository 118 may also contain executable program files or other files needed to implement system 117, including files that are used by repository 118 and files that are provided to other components of system 117.

Repository 118 may communicate with network 128 through interface 122. Network 128 may be, for example, a LAN, a WAN, an Intranet, the Internet, or any combination of these networks, and interface 122 may be a network interface card, a modem, or other appropriate communications hardware. Any of a number of other data storage systems and communication systems could also be employed to store and communicate information on educational topics.

Information from repository 118 may be communicated through network 128 to network service provider 130, which may be an Internet service provider (ISP). Network service provider 130 may in turn communicate with a number of terminal devices. The terminal devices may also communicate directly with network 130 or directly with repository 118. Education information may also be stored at the terminal devices rather than at repository 118.

Network service provider 130 may also communicate wirelessly with a number of computing devices 132, such as a PDA. Other wireless devices, such as telephones, palm-size computers, laptop computers, or desk-top computers could also be used.

Network service provider 130 also may communicate with a local computer 134. Local computer 134 may then be used to present information from repository 118 to a student. Alternatively, local computer 134 may also communicate with another computing device 136, such as a PDA. Local computer 134 may provide information to, and receive information from, network service provider 130, and computing device 136 may provide information to, or receive information from, local computer 134, for example, via a serial cable or a USB connection.

Local computer 138 may also provide information to, or receive information from, network service provider 130. Local computer 138 may communicate with multiple computing devices 140 by a wireless communications protocol. For example, local computer 138 could be a teacher's personal computer in a classroom, and computing devices 140 could be PDA's possessed by students in the classroom. Computing devices 140 may communicate with local computer 138 or may communicate directly with each other.

In operation, educational information may be retrieved from repository 118. For example, local computer 134 may submit to repository 118 a request for educational information on a particular topic. Processor 126 may then search databases 120 for relevant information and transmit the information back to local computer 134. Local computer 134 may then provide the information to a user, to computing device 136, or to another device.

Educational content stored in repository 118 may comprise social science, mathematics, science, business, health, English, world languages, and other topics. Access to the educational content may be restricted in any of a number of well-known methods, such as by password protection or hardware recognition. The educational content may be comprised of questions and answers to many different questions, may be arranged by topic, and may be drafted to correspond to the information taught in a particular book, such as a textbook. A student may download content corresponding to an entire book or to a chapter in a book, and the results of a student's progress may be uploaded and tracked. Educational content may also be distributed in other ways, such as on recordable media.

Figure 8:
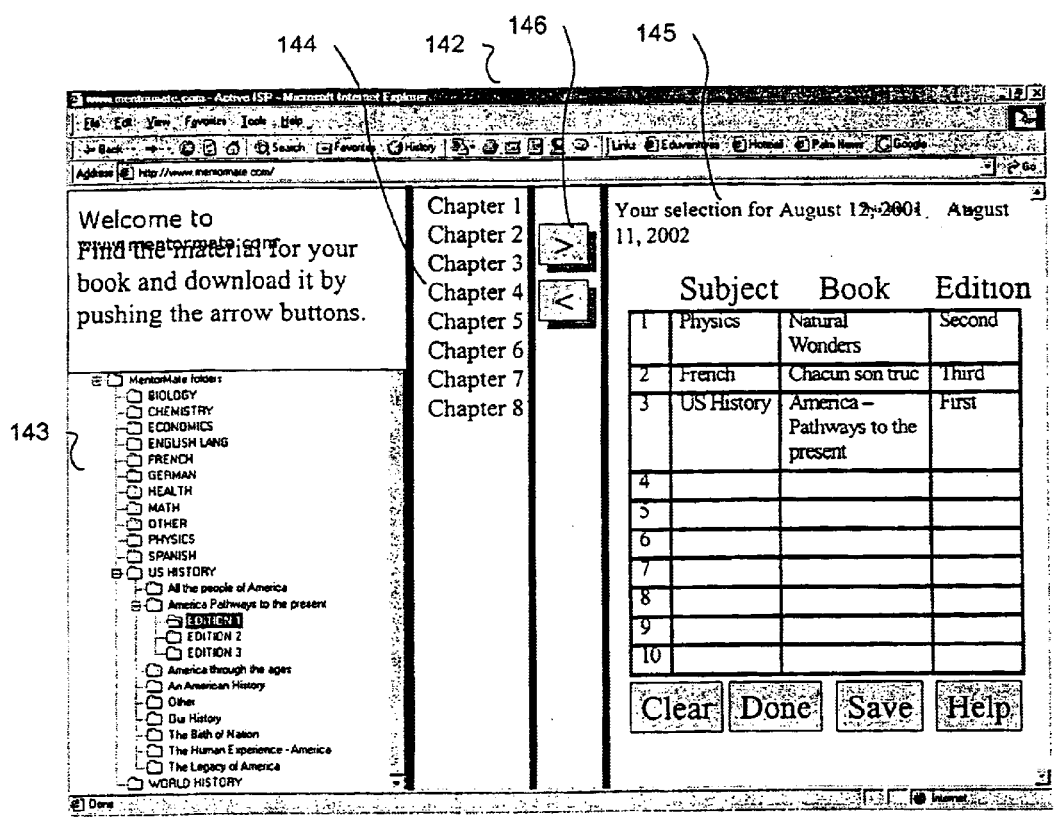
FIG. 8 shows a display of the organization of various educational information that may be quizzed.

FIG. 8 shows a display of the organization of various educational information that may be quizzed. Window 142 shows information grouped by subject and related textbooks in organization display 143, so that a student can browse for quizzing information. Detailed display 144 shows the contents of a particular subject or book, such as by breaking the content into chapters. Selected material 145 may be displayed for multiple subjects and may represent materials on which a student wishes to be quizzed during an approaching period of time. Selectors 146 allow a student to move subjects in or out of the selected material 145. The information shown in window 142 may represent information in a data repository or that stored in another location. Through window 142, a student may select topics for future testing by "checking out" certain files, and may also "check in" other files so that a central system may track the student's progress through various topics.

FIG. 9 illustrates a display 147 for tracking a student's progress in multiple subjects. The student may access display 147 and may make alterations to the information being tracked. Alternatively, teachers or parents could access display 147 to track a student's progress. Display 147 may be organized to show subjects that a student would like to review, dates on which the review is to begin and end, desired grades compared to present grades, number of days remaining until an exam, and the approximate number of minutes of study each day needed to obtain the desired grade on the exam. In addition, data from testing results could be aggregated for an overall analysis across multiple students, such as by a textbook publisher that is interested in improving its books in areas where students have particular problems.

Other data about testing results may also be stored and analyzed. In particular, progress through a group of fact elements or all button pushes may be logged and may then be analyzed. For example, the average time to learn a certain amount of knowledge may be computed, and may be used to recommend a length of study sessions for future testing. The application may also track study habits, or user profiles, with respect to frequency, length of time, and time of day of study sessions. This information could be used to dispense automatic advice to improve study habits, such as by setting alarms to sound if material is not studied for a predetermined period of time, by providing study tips, or by establishing a study schedule based on past learning speed and study habits. The information could also be used to identify a student as having a particular study type, and to provide advice based on general known characteristics of students that fall within the study type. The application could also track forgetfulness by correlating how quickly a user forgets a fact, and could use this information to recommend timing of study sessions so that adequate knowledge is retained at the time of the actual exam. Usage data may also be tracked, so as to provide information, such as a graph, to show progress toward a goal. Information on fact elements for which a student had trouble could be used to recommend review of portions of the primary educational material (such as a textbook).

In addition, multiple remote testing devices may be used simultaneously and the progress of the various students may be tracked by a central terminal, such as a teacher's personal computer. For example, multiple students in a single classroom could be subject to testing on a particular subject at the same time, and a teacher could receive information on the progress of each student individually or on the group of students as a whole. For example, the teacher may be provided with information about particular fact elements or groups of fact elements whose questions are being answered slowly or incorrectly by many of the students. In response, the teacher could halt the testing and provide remedial instruction on those fact elements. The teacher could also provide additional instruction on particular points after the testing in finished. In this manner, a teacher may target instruction more closely to the particular needs of a class, and may avoid reviewing material that students have already mastered. In addition, the system could be used for providing the actual test. Furthermore, two or more students could use wired or wireless communications to compete against each other as part of a review session, or could work together to solve more complicated questions.

The testing application may be provided with additional features to assist a student in learning a subject. For example, the application may provide a range of hints when a student answers a question incorrectly, when the student has not provided an answer after a predetermined period of time, or upon a request for a hint from the student. In addition, for open-ended questions and reverse open-ended questions, the application may provide a built-in thesaurus so that common misspellings of correct answers do not result in the registration of an incorrect result. Furthermore, answers may be reviewed based on an honor system, whereby the student reviews a question, forms an answer mentally, and the application then provides the answer and asks the student whether his or her mentally formed answer was correct. As another assistance, the application may accept an answer as correct if the student enters the first character or several characters of a correct answer. In this manner, the application may save a student's time when the student knows the full answer. This feature may be enabled if the student has answered the other semantic forms of the question for the fact element correctly, but be disabled if the student has incorrectly answered any questions related to the fact element.

Figure 10:
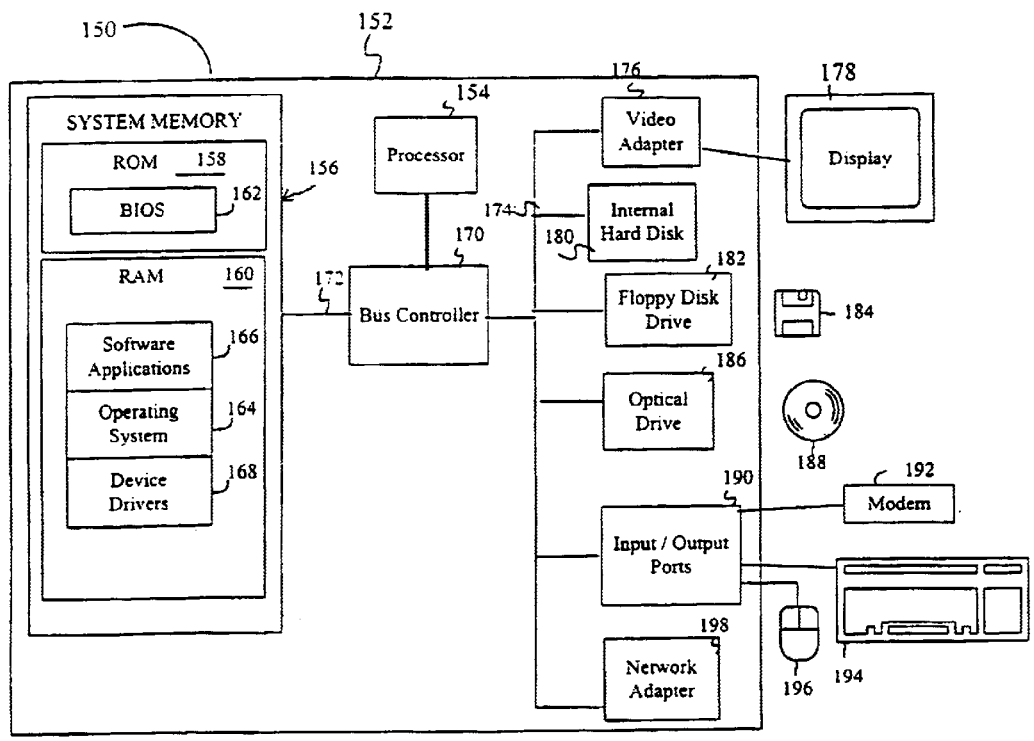
FIG. 10 illustrates a programmable computing system that provides an operating environment suitable for implementing the invention.

FIG. 10 illustrates a programmable computing system 150 that provides an operating environment suitable for implementing the techniques described above, either as a central information repository, as a remote terminal, or as a portable device. The system 150 includes a computer 152 that contains a processor 154 connected to system memory 156 through bus controller 170 and system data/address bus 172. Memory 156 includes read only memory (ROM) 158, which may include BIOS 162 or other components, and random access memory (RAM) 160, which may be used to store an operating system 164, software applications 166, and various device drivers 168. In one embodiment, however, software applications 166 are stored in ROM 158 and are copied to RAM 160 for execution, or are executed directly from ROM 158. In various configurations, system 150 represents any server, personal computer, laptop or even a battery-powered, pocket-sized, mobile computer known as a hand-held PC or personal digital assistant (PDA). System 150 could also represent a variety of processors, communications devices, and storage devices tied together in a network, included a local area network (LAN), a wide area network (WAN), a virtual private network (Intranet), or the Internet.

Bus controller 170 may connect to other devices through input/output bus 174. For example, input/output bus 174 may support a video adapter 176 connected to display 178 (or multiple displays) to provide visual output for system 150. Bus controller 170 may also support any of a number of input or storage devices, such as internal hard disk 180, floppy disk drive 182, which accepts floppy disk 184, and optical drive 186, which accepts optical disk 188. Other devices, such as modem 192, keyboard 194, and mouse 196, may be connected to input/output bus 174 through input/output ports 190. Other types of input devices (not shown) include track pads, track balls, joysticks, data gloves, head trackers, microphones, and other devices suitable for positioning a cursor on video display 178, or for otherwise providing directions to system 150. In addition, network adapter 198 may be provided to give system 150 access to external resources, such as a LAN, WAN, VPN, or the Internet.

A number of embodiments of the invention have been described. Nevertheless, it will be understood that various modifications may be made without departing from the spirit and scope of the invention. For example, as noted, the invention is not limited to particular arrangements of a fact element, and can extend to multiple arrangements that allow a fact element to be posed in a plurality of formats to a student. In addition, various fact elements or portions of fact elements may differ from each other and may be linked together to provide added functionality for the system and method. Also, although users of the system have been described only as students, this term is meant to include any person who is seeking to learn about a particular topic or topics. In addition, the steps described do not have to be performed in every situation, and the steps could be performed out of order or interleaved. This application is intended to cover any adaptation or variation of the present invention. It is intended that this invention be limited only by the claims and equivalents thereof. Accordingly, other embodiments are within the scope of the following claims.

What is claimed is:

1. A method implemented in a computer program application operable to teach an educational subject to a student, comprising:

accessing a plurality of fact elements, wherein each fact element represents a unit of information about an educational topic;

presenting a first fact element from the plurality of fact elements to the student in a first semantic format;

receiving from the student a first response to the first fact element in the first semantic format;

comparing the first response to a predetermined appropriate response, generating an indication that the first response corresponds or fails to correspond to the predetermined appropriate response, and if the first response corresponds to the predetermined appropriate response, then presenting the first fact element in a second semantic format different from the first semantic format that is dependent on the first response; and receiving from the student a second response to first fact element in the second semantic format;

wherein the fact elements are presented and the responses are received by components of an electronic computing device.

2. A method implemented in a computer program application operable to teach an educational subject to a student, comprising:

accessing a plurality of fact elements, wherein each fact element represents a unit of information about an educational topic;

presenting a first fact element from the plurality of fact elements to the student in a first semantic format;

receiving from the student a first response to the first fact element in the first semantic format and generating an indication that the first response matches or fails to match a predetermined appropriate response;

presenting the first fact element in a second semantic format that is dependent on the first response and;

receiving from the student a second response to first fact element in the second semantic format;

wherein the first fact element is presented in a second semantic format that differs from the first semantic format if the first response matches a predetermined correct value for the semantic format; and wherein the fact elements are presented and the responses are received by components of an electronic computing device.

3. The method of claim 1, wherein the first fact element is presented in a second semantic format that is the same as the first semantic format if the student indicates uncertainty with respect to the fact element presented in the first semantic form.

4. The method of claim 1, wherein the first semantic format is a true/false format, and the second semantic form is a multiple choice format.

5. The method of claim 1, wherein the method is performed on a personal digital assistant.

6. The method of claim 1, wherein the plurality of fact elements are accessed from a remote web server.

7. The method of claim 1, wherein the plurality of fact elements corresponds to a single chapter of a textbook.

8. The method of claim 1, wherein the first semantic format and the second semantic format are selected from the group consisting of fact, true/false, double choice, multiple choice, fill-in-the-blank, open-ended, and reverse open-ended.

9. The method of claim 1, wherein the first fact element is presented as a question.

10. The me of claim 9, wherein the first fact element comprises a question, a correct answer, and a plurality of incorrect answers.

11. The method of claim 1, further comprising presenting a first memory aid to the student after presenting the first fact element in a first semantic format.

12. The method of claim 11, further comprising presenting a second memory aid to the student alter presenting the first fact element in a second semantic form.

13. The method of claim 11, wherein the memory aid is a picture composed of a plurality of distinct drawing components.

14. The method of claim 12, wherein the first memory aid is the same as the second memory aid.

15. A method implemented in a computer program application operable to teach an educational subject to a student, comprising:
   accessing a plurality of fact elements, wherein each fact element represents a unit of information about an educational topic;
   presenting a first fact element from the plurality of fact elements to the student in a first semantic format;
   receiving from the student a first response to the first fact element in the first semantic format;
   presenting the first fact element in a second semantic format different from the first semantic format that is dependent on the first response;
   receiving from the student a second response to first fact element in the second semantic format; and
   comparing the first response to a predetermined correct response, and presenting the first fact element in a second semantic format only if the first response matches the predetermined correct response;
   wherein the fact elements are presented and the responses are received by components of an electronic computing device.

16. The method of claim 1, further comprising arranging the plurality of fact elements in a continuous queue, and placing the first fact element at the rear end of the queue if the first response matches a predetermined correct value for the semantic format.

17. The method of claim 16, further comprising removing the first fact element from the queue after it has been presented in all of its available semantic formats.

18. A computer-readable medium carrying program code that, when executed:
   accesses a plurality of fact elements, wherein each fact element represents a unit of information about an educational topic;
   presents a first fact element from the plurality of fact elements in a first semantic format;
   receives from a user a first response to the first semantic format;
   presents the first fact element in a second semantic format different from the first semantic format;
   receives from the user a second response to the second semantic format; and
   wherein the fact elements are presented in the second semantic format only if a response to the first semantic format corresponds to a predetermined appropriate response.

19. A computer-readable medium carrying program code that, when executed:
   accesses a plurality of fact elements, wherein each fact element represents a unit of information about an educational topic;
   presents a first fact element from the plurality of fact elements in a first semantic format;
   receives from a user a first response to the first semantic format;
   presents the first fact element in a second semantic format different from the first semantic format;
   receives from the user a second response to the second semantic format; and
   compares the first response to a predetermined correct response and causes the first fact element to be presented in the second semantic form only if the first response matches the predetermined correct response.

20. The computer-readable medium of claim 19, wherein the second semantic format is a higher order of complexity than the first semantic format.

21. The computer-readable medium of claim 20, wherein the second semantic format is a multiple choice format end the first semantic format is a true/false format.

22. The computer-readable medium of claim 19, the medium further carrying program code that, when executed arranges the plurality of fact elements in a continuous queue, and places the first fact element at the rear end of the queue if the first response matches a predetermined correct response.

23. A method implemented in a computer program application operable to conduct a question-and-answer testing session, comprising:
   accessing a plurality of fact elements;
   iteratively presenting the plurality of fact elements in a plurality of different question formats, wherein a first fact element is presented in a first question format, a second fact element is presented in the first question format, the first fact element is presented in a second question format different from the first question format, and the second fact element is presented in the second question format;
   wherein the fact elements are presented in the second question format if a response to the fact element corresponds to a predetermined appropriate response; and
   wherein the fact elements are presented and the response is received by components of an electronic computing device.

24. The method of claim 23, further comprising receiving a plurality of answers from a user, wherein each answer corresponds to a presentation of a fact element in a particular form, and comparing each of the plurality of answers to a predetermined correct answer.

* * * * *

UNITED STATES PATENT AND TRADEMARK OFFICE
CERTIFICATE OF CORRECTION

PATENT NO. : 6,905,340 B2
DATED : June 14, 2005
INVENTOR(S) : Bjorn Stansvik

It is certified that error appears in the above-identified patent and that said Letters Patent is hereby corrected as shown below:

<u>Title page,</u>
Item [73], Assignee, delete "Mentormate" and insert -- MentorMate --;

<u>Column 17,</u>
Line 20, delete "me" and insert -- method --;

<u>Column 18,</u>
Line 34, delete "end" and insert -- and --.

Signed and Sealed this

Seventh Day of March, 2006

JON W. DUDAS
*Director of the United States Patent and Trademark Office*